Figure 1:
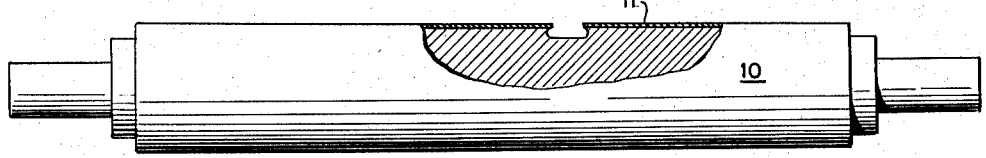

May 19, 1959   F. W. BRODERICK ET AL   2,887,042
EMBOSSING ROLLS AND PRODUCT THEREOF
Filed March 22, 1955   2 Sheets-Sheet 1

INVENTOR.
Frank Broderick
BY
*Frank Mahora*
ATTORNEY

May 19, 1959     F. W. BRODERICK ET AL     2,887,042
EMBOSSING ROLLS AND PRODUCT THEREOF

Filed March 22, 1955     2 Sheets-Sheet 2

INVENTOR.
Frank Broderick
BY
*Frank Mahore*
ATTORNEY

United States Patent Office 2,887,042
Patented May 19, 1959

2,887,042

EMBOSSING ROLLS AND PRODUCT THEREOF

Frank W. Broderick, New Providence, and John Sidney Morgan, Summit, N.J., assignors to Eastern Engraving and Machine Co., Inc., Stirling, N.J., a corporation of New Jersey Application March 22, 1955, Serial No. 495,979

2 Claims. (Cl. 101—28)

This invention relates to a method of engraving a female steel roll and mating it at optimum pitch angle to a matching male steel roll, to the mated rolls produced by the process, as well as to the product produced by the rolls.

The engraved matched steel rolls of this invention are particularly useful in the continuous embossing of aluminum, steel or stainless steel strip. However, any metal strip, plastic, textile, laminate material as well as cellulosic paper, cardboard and similar strip or sheet products may be embossed by the novel engraved matched rolls of this invention.

Prior to this invention matched engraved rolls were made by rolling under great pressure a small extremely hard mill roll having a desired pattern engraved thereon against a large soft steel roll, said steel roll having been coated with an acid resistant waxy material. Intricate patterns on large repeat areas generally required several different mill rolls to complete the pattern on this large soft steel roll. The rolling together of the hardened mill roll with its engraved pattern against the coated large soft steel roll would cause the mill pattern to indent into the large soft roll and at the same time would remove the acid resistant coating at all points where such indenting occurred. After indenting the soft roll to the maximum of the grain structure, the mill is removed, so that the large soft steel roll now shows the transferred pattern as exposed metal in a large area of waxy material. The soft roll is then placed in an acid bath to permit acid etching on the exposed metal. In the preliminary stages of this process the acid is used primarily to break down the compacted grain structure of the indented pattern, remove excess metal, and permit additional penetration and movement of metal in order that full transfer of the mill pattern to the large soft roll may be attained. Many such acid bath treatments may be necessary to attain the desired results and in each instance the acid etched roll of the prior art is wiped free of the used waxy acid resistant material, recoated with fresh waxy acid resistant material and subjected again to the mill roll whereupon the elevations of the mill roll are forced into the previously formed acid etched cavities thereby again forcing the wax from said cavities to permit deeper and wider penetration of the mill pattern. The roll is then again acid etched as above described.

This process of treating the waxy acid resist coated large roll with the engraved mill roll followed by an acid etch is repeated until a desired cavity depth, for example, about 30 mils deep, is obtained. Depth of pattern, density of grain as well as intricacies of pattern may make a vast number of mill rolls acid bath treatments necessary. As full transfer of the pattern nears completion extreme care must be used not to permit the acid bath to etch to a point exceeding the full depth of the mill pattern. Many extremely weak acid bath solutions are used at this stage of transfer and much time is consumed in re-coating the large roll and re-rolling the mill pattern over the coated roll prior to each acid bath. In the acid etching of the female cavities in the prior art, the walls of the cavities were subjected to a treatment producing a rotary curved indention on the side walls. As a result, under-cutting of the cavity edges was non-existent and pattern designs which required very sharp outlines were poorly defined due to the curvatured or rounded edges produced by this prior art process.

Also in the prior art since the edges of the cavities of the female roll were generally rounded or eaten away during the process of preparing said roll by the use of an engraved mill roll followed by acid etching, the corresponding male roll prepared from the female roll was correspondingly defective.

Moreover, in the prior art, the necessity of heat treating and hardening the rolls after engraving created distortion and warpage of the pattern.

It is an objective of this invention to provide a method for producing mated steel embossing rolls capable of producing very sharply defined designs on a strip of material passed therebetween. It is another objective to provide a female embossing roll having cavities having side walls of uniform and controlled undercut. It is another objective of this invention to provide a process for producing uniform undercutting of a photo-engraved surface.

It is another objective to provide mated steel embossing rolls having uniformly undercut cavitated designs on the female roll and a matching mated male roll with an optimum rotative pitch angle on the male pattern elevations being automatically transferred thereto by the female rolls.

It is another objective to provide mated steel embossing rolls having uniformly cut cavitated designs adapted to produce designs of superior clarity on a strip of metal passed therebetween.

It is another objective to provide a method of obtaining high speed production using coil-fed material between a pair of matched steel embossing rolls to produce embossed patterns of great clarity on said fed material.

It is another objective to provide a process for forming sharp edged cavities on female embossing rolls.

Figure 2:
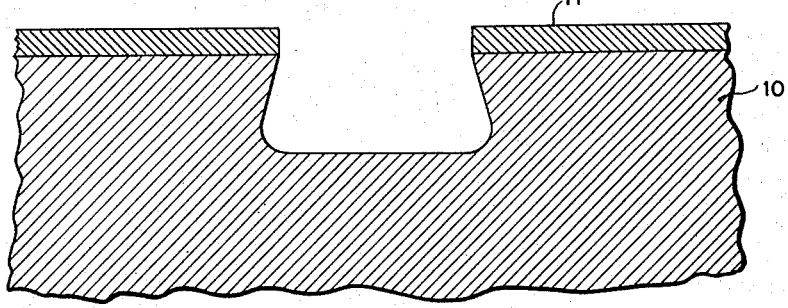
Figure 3:
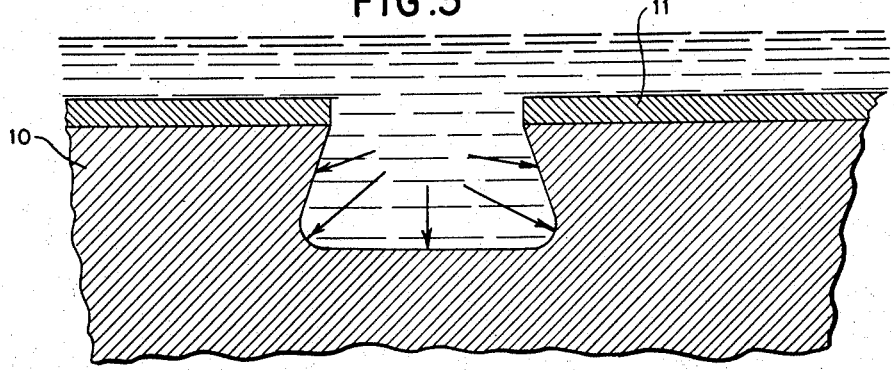
Figure 4:
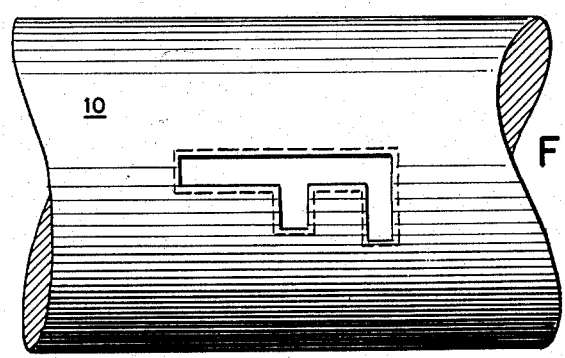
Figure 5:
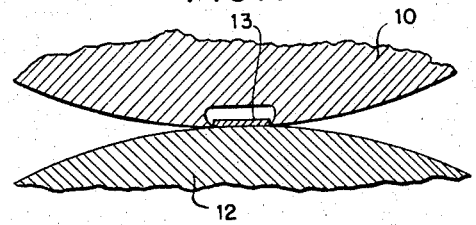
Figure 6:
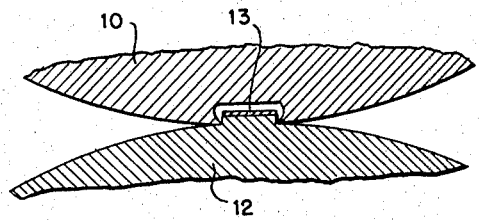
Figure 7:
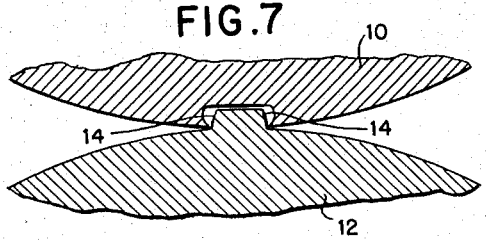
Figure 8:
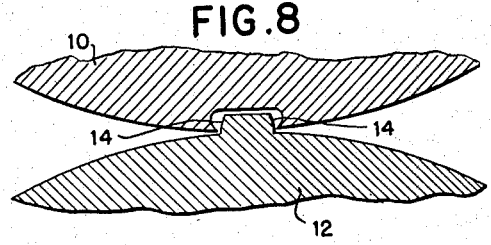
Figure 9:
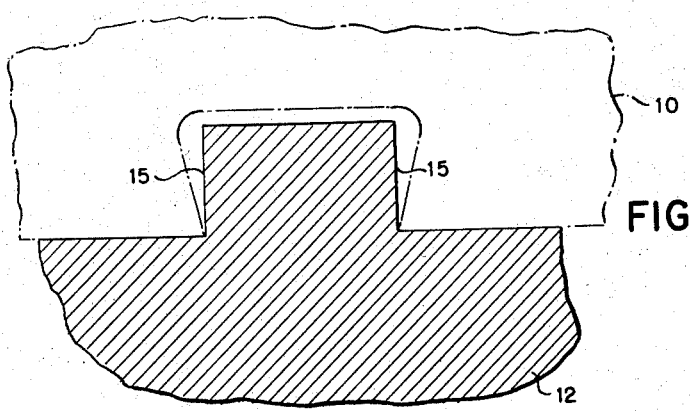
Figure 10:
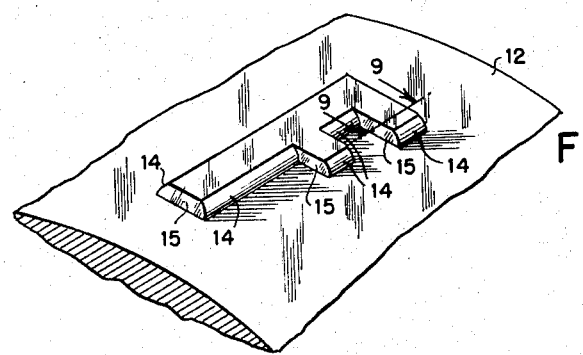

These and other objectives of this invention will become apparent upon reading the following descriptive disclosure taken in conjunction with the drawing in which;

Fig. 1 is a front view of a female embossed roll, broken away in part, to show the layer of wax resist used thereon, Fig. 2 is a detailed section view of a female roll cavity, Fig. 3 is a view similar to Fig. 2 but showing the manner of acid etching the cavity side walls and bottom wall by aqueous acid solution, Fig. 4 is a top view of a cavity showing in outline the uniform undercut, Fig. 5 is an enlarged cut-away view taken at the start of the controlled etching procedure and showing the retention on the male roll of the pattern in the form of waxy acid resistant material, Fig. 6 is an enlarged cut-away view of the etching process showing the start of rotative pitch angle caused by the feather edges of a female cavity on the female roll, Fig. 7 shows the completed pattern transfer to male roll, and the sharp female cavity pattern edge retained after the transfer of the pattern to the male roll with optimum rotative pitch angle on the matching male roll protuberances, Fig. 8 shows all over clearance etch given to the male mating roll to permit movement of metal being embossed into the female sharply defined cavity, Fig. 9 is a section view showing end walls of a protuberance taken on line 9—9 of Fig. 10, and Fig. 10 is a view of a protuberance in the shape of a letter F and showing the rotative angular slope in both the leading and in the rear walls thereof and further showing the perpendicularity of the end walls of said protuberance.

The pre-hardened rolls to be etched by the process of this invention are obtained by the conventional commercial photo-engraving process using gelatin coating on a highly polished steel roll. The etched image on the steel polished roll, that is the female roll 10, as received have depth of the order of about one thousandth of an inch.

This roll having the photo-engraved pattern thereon is coated by means of a carefully applied acid resist 11 having asphalt and latex therein, so that the periphery of the photo-engraved roll is coated without any depositing of the coating material in the cavity although the cavity is but one thousandth of an inch deep.

The asphalt-latex composition is prepared so that it possesses a desirable internal cohesiveness as well as a desirable adhesiveness toward polished metal (Fig. 2) without any flowing over the cavity edge whatsoever.

The prevention of any flowing of the acid resistant coating material into the cavity is critical and in part differentiates this process from the prior art process where the acid resistant coating was smeared over the soft steel roll surface thereby filling the milled design pressure-created cavities thereon.

The asphalt-latex coated photo-engraved rolls of this invention are then subjected to the conventional mineral acid treatment of etching strength until a depth of the design cavities of about thirty thousandths of an inch is obtained. The cavities thus formed have a uniformly sloping under-cut knife ledge or cavity feather edge merging with the peripheral surface of the polished steel roll.

The characteristics of the undercut are critical since the cavity feather edge, especially on the leading and on the rear cavity edges, function as wiping surfaces in the formation of the male embossing roll as will be described hereinafter.

The asphalt-latex composition is applied by means of an applicator roll of suitable material, for example, hard-rubber and adapted to contact the entire photo-engraved roll with a light osculation pressure, thereby permitting the transfer of the coating material without squeezing it into cavities of a depth of as little as one thousandth of an inch.

The composition used for making the acid resistant material may vary considerably but it must not bleed or run into the cavities of the female roll in any amount whatsoever.

In preparing the female roll for acid etching the roll itself is heated to about 280° F. and the composition of asphalt latex is heated to about 160° F. whereupon it is applied by the applicator roll or otherwise to form a coating on the female roll of 0.001 to 0.003 inch in thickness.

The coated roll is then air dried and allowed to cool to room temperature to obtain a set or physical state wherein the coating is relatively soft but not tacky. The roll is then immersed in the conventional aqueous nitric acid etching solution and rotated until the desired depth of etching is obtained. At this point the female roll 10 is completed.

The prepared female roll 10 is now ready for use for making the male matched roll 12. In this process the male roll is heat treated and hardened before mating and matching to the female roll. The conventional topping compound 13 having a waxy or paraffin base is used. It is smeared onto the male roll as in the prior art manner so that the high spots of the female roll produce a shiny metal surface on the male roll whereas the design cavities of the female roll appears on the male roll as wax coated areas. Acid etching of the male roll causes the shiny metal to be eaten away so that the wax covered areas thereon may enter into the cavities of the female roll. In the preparation of the male roll the top feather edge of the cavity side walls of the female roll forms a critical function in forming the mating male roll. In forming the male roll 12 the prepared female roll is rotated without pressure against a male roll smeared or well coated with a waxy or paraffin composition. Since the male roll at the start of the operation has a smooth peripheral surface, the female roll squeezes off all waxy composition from the male roll, except where the cavitated design on the female roll occurs, so that the design in intricate and extremely accurate detail is transferred in a wax composition and thus appears on the bright peripheral surface of the male roll.

The design containing male roll is acid etched with either nitric acid or nitric acid mixed with acetic acid. The etching of the male roll is allowed to continue until a desirable depth is obtained. The old wax coating is then removed and a new coating is smeared onto the male roll whereupon the preliminary etched male roll is brought into pattern registry with the female roll and the rolls are again rotated against one another without any substantial pressure. In this second application of the male roll to the female roll, the male protuberances formed in the preliminary acid etching treatment enter into the female cavities in a manner so that the wax coated walls on the front or leading side and on the rear of the male protuberances are wiped by the feather edge of the leading side or of the rear respectively of the female cavities as the protuberances enter and leave the cavity during the rotation of the rolls thereby wiping the male protuberance front and rear walls free from wax to permit acid etching to obtain optimum or correct rotative pitch angle 14 of said walls.

Accordingly the forward and the rear walls of the male protuberances have pitch angle or slope commensurate to the radii of the male and the female roll. And since the radius of the male and the radius of the female roll are substantially identical at all times, so that if the female roll is of large radius necessarily the male roll has a like large radius, and conversely if the radius of the female roll is small necessarily the radius of the male roll is small, it is apparent that the pitch angle is proportionate to the radius of either roll. Also the angle of slope on the leading wall is identical to angle of slope on the rear wall of the protuberances of a male roll. Furthermore, the pitch angle or slope of both the leading and of the rear wall of all the protuberances on a male roll are identical.

Moreover, it was found that the larger the roll diameter the smaller is the pitch angle or slope of the protuberance leading and rear walls, and vice versa the smaller the roll diameter the larger is the angle of slope of the protuberance leading and rear walls.

The end walls 15 of the protuberances are parallel to the end walls of the embossing rolls and are therefore perpendicular to the roll surface at the loci of contact since these end protuberance walls do not slopingly wipe the side knife edges of the corresponding female cavity. Thus, for example, the shape of a male parallelepiped protuberance would have a slope, relative to the top or the base of the parallelepiped, on both the leading wall, i.e. the wall first entering into the female cavity during rotation, and also on the rear wall, i.e. the wall leaving the cavity, but the side or end walls 15 of the parallelepiped would be perpendicular.

The male roll now possesses the waxy design on the protuberance tops on an otherwise shiny metal peripheral surface. These protuberances on the roll having bright metal walls on their front and rear walls are then placed in an acid bath and rotated for a suitable time until the acid has eaten away some of the exposed peripheral surface of the male roll as well as some of metal from the exposed protuberance walls.

Thus the male protuberances mate in the rolls of this invention in accurate matched relationship at the optimum angle, i.e. the optimum rotative pitch angle, into the corresponding female cavities in much the same manner that gear teeth mesh or mate with one another.

The wax treatment of the male roll is done at room temperature at all times.

After the male protuberances on the male roll are fully formed so that they fully mate or nest into a corresponding female cavity at the optimum rotative pitch angle, the male roll is cleaned of all waxy coating material, whereupon the bright metal male roll is acid etched on its entire surface to form a clearance tolerance adapted to receive the thickness of the material to be embossed.

Where aluminum strip is to be embossed the clearance tolerance is adjusted to the thickness of the aluminum strip.

The rotary matched steel embossed rolls of this invention may be used to emboss metal strip, metal foil, paper, plastic, laminate material, etc.

While flat material has been known to have been coated with a wax coating and design made in the wax coating followed by acid etching, it has never before been possible to produce photo-engraved female rolls having uniformly under-cut cavity edges and mated male rolls with optimum or correct rotative pitch angles on their protuberances.

The cavity feather or knife edges of the female roll also function in the preparation of embossed strip. They produce exceptional clarity of design in the embossed strip since the cavity is adapted to receive the corresponding male protuberance in a mated manner over the sharp metal de-forming knife edges.

The embossed strip obtained from the above-described mated rolls is also novel since it has great clarity of design caused by the male protuberance forcing the strip material over the knife edges of the cavity. The embossed strip possesses protuberances substantially identical to the protuberances on the male roll, thus the protuberances on the embossed strip have sloped leading and rear walls and substantially perpendicular end walls.

This invention has been described by means of an embodiment but other obvious embodiments are clearly within the scope of this invention and are intended to be covered by the claims herein.

We claim:

1. The process of preparing a pair of mated female and male embossing steel rolls from a photoengraved polished female steel roll having depressions of a depth of about one thousandth of an inch comprising heating said photoengraved roll, coating said roll with a hot asphalt-latex acid resistant composition of about .001 to .003 inch thick without depositing said composition in said depressions, cooling said coated roll, etching said coated roll with aqueous acid solution in the uncoated depressions and forming chemically undercut cavitated depressions of about 30 mil depth having a uniform peripheral knife edge, coating a polished male steel roll with acid resistant wax composition, contacting without pressure said female cavitated roll to the surface of the coated male roll to force the composition into the cavities of said female roll, removing said female roll from contact with said male roll leaving the cavities of the female roll design on said male roll as a plurality of wax protuberances surrounded by male roll bright metal, etching said male roll bright metal areas with acid solution to produce cavities in said male roll, recoating said etched cavitated male roll with acid-resistant composition, contacting without pressure said re-coated male roll in mating relationship to said female roll, inserting said male protuberances into said female depressions so that the leading and retreating wax coated protuberance walls are wiped by the respective knife edges of the female cavity to expose bright metal leading and retreating protuberance walls, and etching said male roll and its bright metal areas exposed on the protuberance walls with an acid solution to produce protuberances having a rotative pitch angle on said leading and retreating walls.

2. The process of claim 1 wherein the female roll and the co-acting male roll have the same radius and have co-acting pitch angles on both their leading and retreating walls of said protuberances corresponding to said radius.

References Cited in the file of this patent

UNITED STATES PATENTS

| | | |
|---|---|---|
| 193,945 | Greene | Aug. 7, 1877 |
| 904,912 | Allison | Nov. 24, 1908 |
| 1,329,088 | Leitner | Jan. 27, 1920 |
| 1,985,300 | Shaw | Dec. 25, 1934 |
| 2,032,771 | Scherer | Mar. 3, 1936 |
| 2,206,290 | Meyer | July 2, 1940 |
| 2,662,002 | Sunderhauf et al. | Dec. 8, 1953 |
| 2,684,291 | Wilson et al. | July 20, 1954 |
| 2,700,205 | Rice | Jan. 25, 1955 |
| 2,816,025 | Dahlberg | Dec. 10, 1957 |